(12) United States Patent
Eustis

(10) Patent No.: US 6,628,293 B2
(45) Date of Patent: Sep. 30, 2003

(54) FORMAT VARYING COMPUTER SYSTEM

(76) Inventor: Mary Susan Huhn Eustis, 6 Raymond St., Lexington, MA (US) 02173

(\*) Notice: Subject to any disclaimer, the term of this patent is extended or adjusted under 35 U.S.C. 154(b) by 32 days.

(21) Appl. No.: 09/791,274

(22) Filed: Feb. 23, 2001

(65) Prior Publication Data

US 2002/0118205 A1 Aug. 29, 2002

(51) Int. Cl.$^7$ .......................... G06F 12/02; G06F 13/00
(52) U.S. Cl. ...................... 345/565; 345/559; 345/536; 709/107; 709/312
(58) Field of Search .................... 345/501, 502, 345/503, 504, 505, 536, 545, 559, 565; 709/100, 102, 104, 106, 107, 312; 711/220

(56) References Cited

U.S. PATENT DOCUMENTS

| | | | | |
|---|---|---|---|---|
| 4,433,377 A | * | 2/1984 | Eustis et al. | 710/16 |
| 5,109,511 A | * | 4/1992 | Nitta et al. | 709/104 |
| 5,761,522 A | | 6/1998 | Hisanaga et al. | |
| 6,098,169 A | * | 8/2000 | Ranganathan | 709/107 |
| 6,243,762 B1 | * | 6/2001 | Greene et al. | 709/106 |

\* cited by examiner

*Primary Examiner*—Ulka J. Chauhan
(74) *Attorney, Agent, or Firm*—Fish & Richardson P.C.

(57) ABSTRACT

A format varying computing system including a computer linked to a display and input device, the computer including memory devices linked to a processing unit and a set of counters residing in the processing unit and linked to the memory devices, the set of counters defining a symbol residing in the memory devices.

11 Claims, 3 Drawing Sheets

FORMAT VARYING COMPUTER SYSTEM

TECHNICAL FIELD

This invention relates to format varying computing.

BACKGROUND

A program counter indicates an address of the next instruction to be executed by a computer processor. Processing in traditional computers involves linear program counters, i.e., instructions are loaded for execution in a linear fashion, one instruction at a time. Processing in parallel computer architectures involve multiple linear program counters that are inter-connected at a level above a linear processing level. Thus, traditional computers process each step of a program in a straight, linear fashion. Parallel processors operate in this manner and are frequently limited to a finite number of simultaneous operations at any one time.

SUMMARY

In an aspect, the invention features a format varying computing system including a computer linked to a display and input device, the computer including memory devices linked to a processing unit and a set of counters residing in the processing unit and linked to the memory devices, the set of counters defining a symbol residing in the memory devices.

One or more of the following features may also be included. The set of counters may include a format varying counter, a data pointer counter and a process counter. The symbol represents a location in one of the memory devices. The memory device may be a diskette drive, hard drive, CD-ROM drive, random access memory, and so forth.

In another aspect, the invention features a format-varying computer including a display and input device linked to a processing unit and a set of counters residing in the processing unit and linked to a plurality of memory devices.

One or more of the following features may also be included. The set of counters include a number of format varying counters, data pointer counters and process counters. The computer may further include memory locations, each one of the memory locations represented by a symbol. Each symbol may be represented by one of the format varying counters, one of the data pointer counters, and one of the process counters. The set of counters may represent multiple simultaneous processes occurring simultaneously in the processing unit.

Embodiments of the invention may have one or more of the following advantages.

The system replaces traditional linear program counters with numerous process counters and/or numerous format and data pointer counters, combining multiple sets of relatively simple operations that perform a designated task to perform complex operations.

Multiple counters for format, multiple counters for data pointers, and multiple counters for processing change linear programming computing to n-dimensional computing, thus providing a computer system with the capability of implementing any process or similar set of processes multiple times simultaneously.

When simultaneous processes are being performed in the system, the results of one process are stored in the same place where the operation took place, a location that may be represented by, for example, a number and a letter that is known to a user. By storing the results of a process in a known location, i.e., the same place the operation took place, more processes are understandable to the user.

The details of one or more embodiments of the invention are set forth in the accompanying drawings and the description below. Other features, objects, and advantages of the invention will be apparent from the description and drawings, and from the claims.

DESCRIPTION OF DRAWINGS

The foregoing features and other aspects of the invention will be described further in detail by the accompanying drawings, in which.

Like reference symbols in the various drawings indicate like elements.

DETAILED DESCRIPTION

Figure 1:
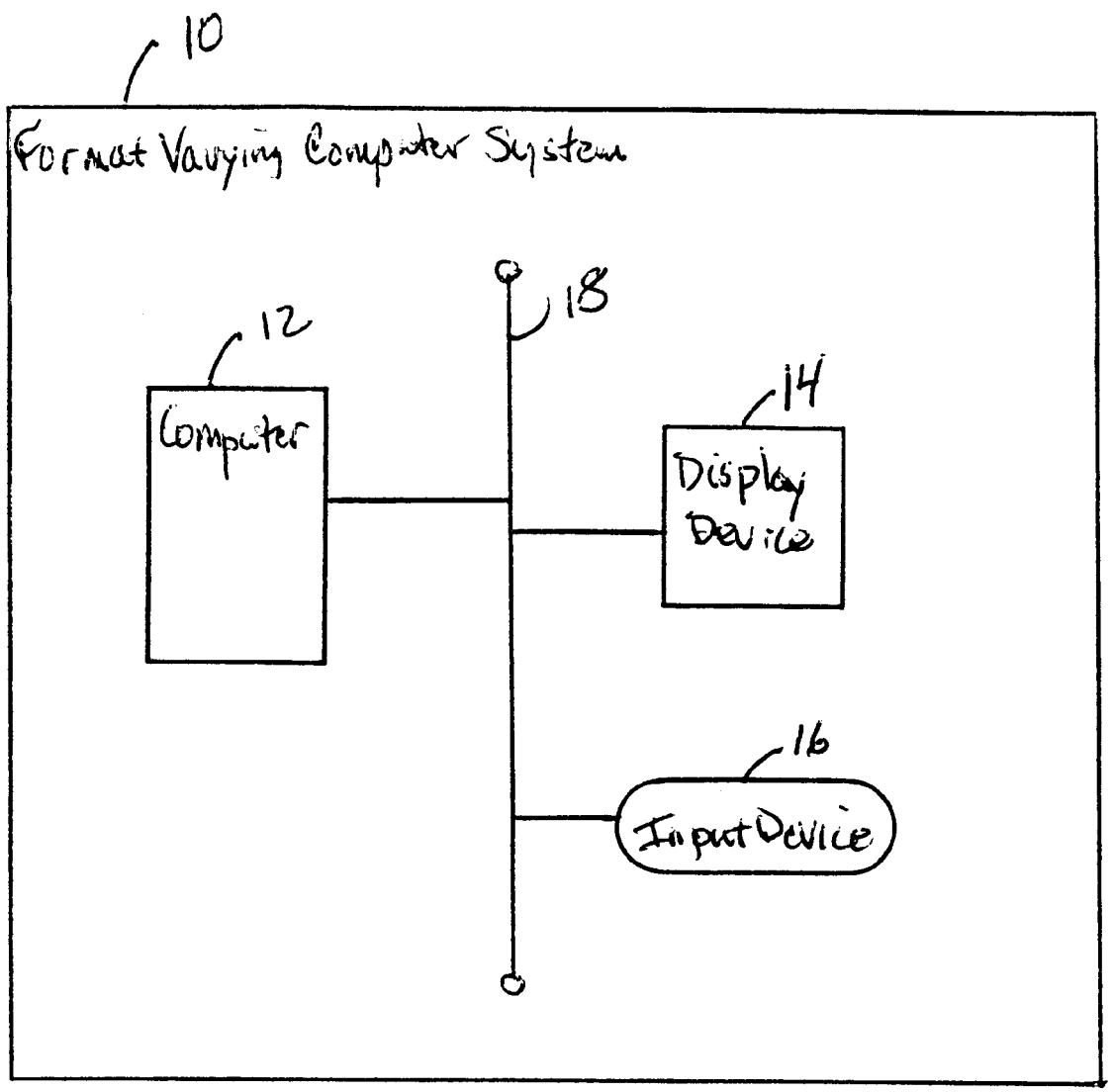
FIG. 1 is a block diagram of an exemplary format varying computing system.

Referring to FIG. 1, an exemplary format varying computing device 10 includes a computer 12 having at least display 14 and an input device 16, such as a keyboard or keyboard in combination with a mouse. The computer 12, display device 14 and input device 16 are connected via a line 18. The line 18 may be a single integrated circuit device, multiple wires, or other suitable interconnections.

Figure 2:
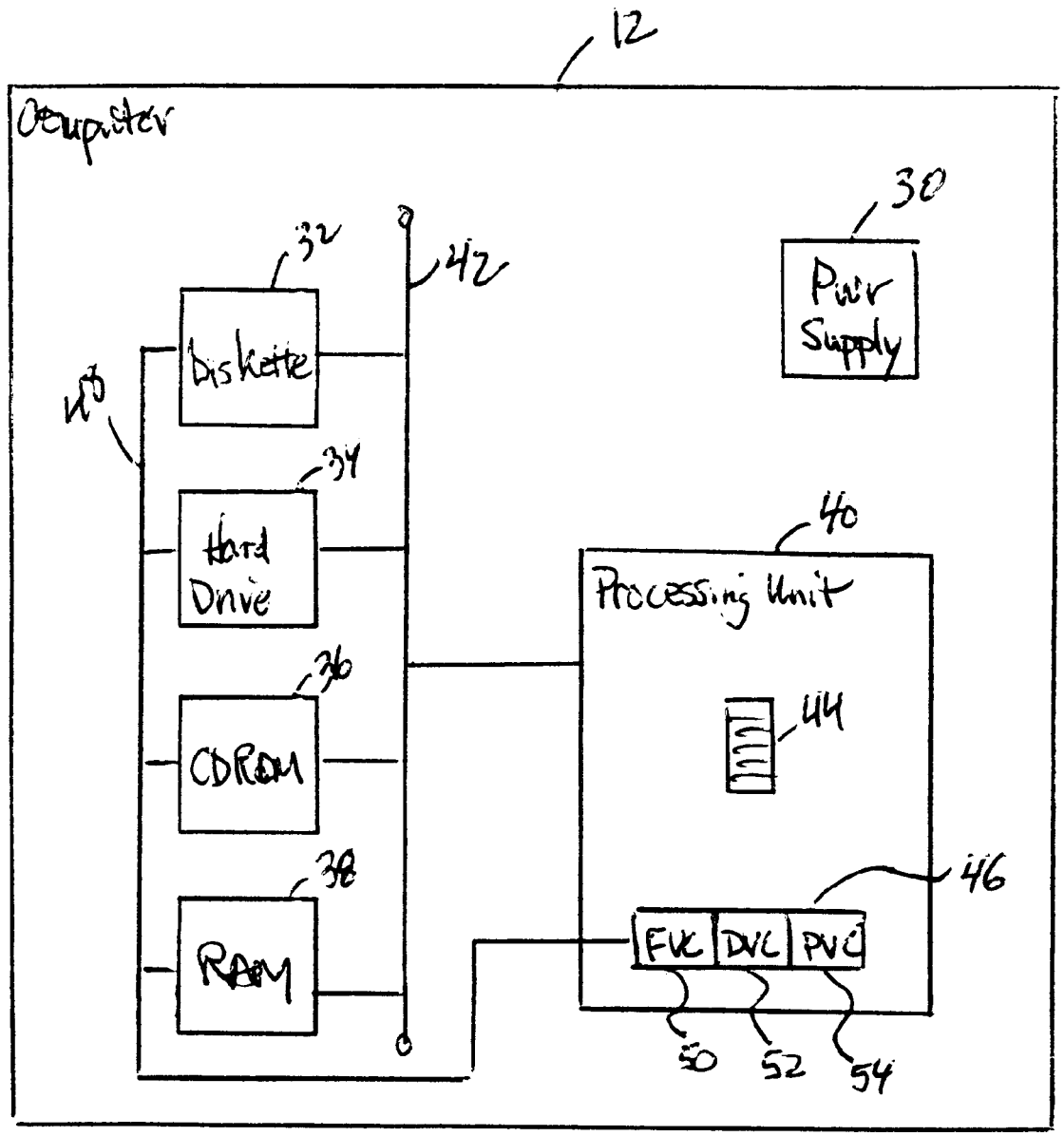
FIG. 2 is a block diagram of the computer of FIG. 1.

Referring to FIG. 2, the computer 12 includes a power supply 30 and a group of memory devices such as diskette storage drive 32, fixed hard drive 34, CD-ROM storage drive 36 and a random access memory (RAM) 38. The memory devices are linked to a processing unit 40 by a line 42. The processing unit 40 receives processing information from the input device 16. The processing unit 40 contains logical instructions 44 that are the steps a program executes within the computing device 10.

A set of counters 46 is connected to the memory devices on line 48. The set of counters 46 include format-varying counters (FVC) 50, data varying pointer counters (DVC) 52, and process varying counters (PVC) 54. The set of counters 46 give definition and specificity to a symbol, fully described below.

The DVC 52 may point to any memory device location and/or any display device location. Display locations are generally arranged vertically and horizontally, like cells in spreadsheet. A symbol refers to a location and is uniquely defined by the multiple counters 50, 52 and 54.

Figure 3:
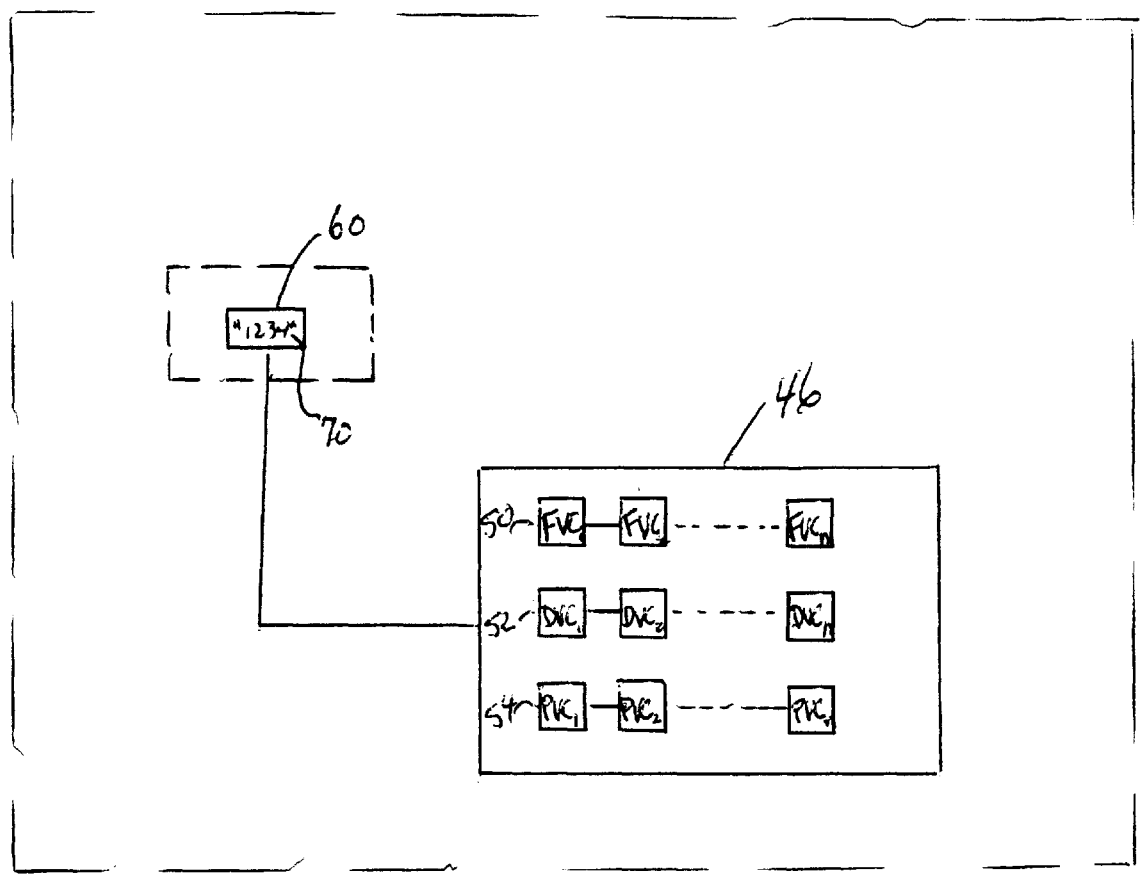
FIG. 3 is a block diagram of the set of counters of FIG. 2

Referring to FIG. 3, for example, the counters 50, 52 and 54 refer to location 60. The location 60 may be in any memory device location or on the display 14. Thus, a number 70 contained in the location 60 is not a number, but a symbol represented by the set of counters 46. Specifically, the number 70 in location 60 is represented by a set of discrete entities that can be segmented into components using the set of counters 46 that define the symbol. In effect, the number 70 at location 60 is a set of images that has a format, a location and a process.

The format is a set of instructions that identify the symbol, such as where the location is placed in a field, whether the location contains an alphanumeric or numeric quantity, whether it is left justified or right justified, whether it is all caps if alphanumeric, and so forth. The data pointer 52 is the definition of where the symbol is located in the different types of memory devices in the computing device 10, such as in the diskette drive 32, hard drive 34, CD ROM drive 36, or RAM 38. The process counter 54 defines a process associated with the symbol. For example, the symbol may have a process as simple as one that represents that there is a number residing on a piece of paper. The process utilizes a set of operators such as, for example, add, subtract, multiply, divide, logical and, logical or, and so forth. Further, the process may involve instructions, such as move and so forth.

The computer 12 includes multiple counters for format, multiple counters for data pointers and multiple pointers for processes. The multiple counters provide n-dimensional computing such as to provide, for example, implementation of any process of similar set of processes may be implemented multiple times, simultaneously. Instead of linear computing, the implementation of multiple counters for format, data pointers and processes in the computer 12 provides simultaneous processing of events contained in different locations. More specifically, use of the counters 46 defines multiple simultaneous processes occurring simultaneously in the computer 12. For example, each location may have the same format and pointer, but may be executing a different process as represented by its process counter.

In an embodiment, a graphical tool is used to link multiple display locations and provides interconnection of multiple processes implemented by multiple process counters.

Other embodiments are within the following claims.

What is claimed is:

1. A format varying computing system comprising:
    a computer linked to a display and input device, the computer comprising:
        memory devices linked to a processing unit; and
        a set of counters residing in the processing unit and linked to the memory devices,
        the set of counters defining a symbol,
        wherein the set of counters comprise:
            a format varying counter;
            a data pointer counter; and
            a process counter.

2. The system of claim 1 wherein the symbol represents a location in one of the memory devices.

3. The system of claim 2 wherein the memory device is a diskette drive.

4. The system of claim 2 wherein the memory device is a hard drive.

5. The system of claim 2 wherein the memory device is a CD-ROM drive.

6. The system of claim 2 wherein the memory device is a random access memory (RAM).

7. The system of claim 2 wherein the memory device is a read-only memory.

8. A format varying computer comprising:
    a display and input device linked to a processing unit; and
    a set of counters residing in the processing unit and linked to a plurality of memory devices,
    wherein the set of counters comprise:
        a plurality of format varying counters;
        a plurality of data pointer counters; and
        a plurality of process counters.

9. The computer of claim 8 further comprising a plurality of memory locations, each one of the memory locations represented by a symbol.

10. The computer of claim 9 wherein each symbol is represented by one of the format varying counters, one of the data pointer counters, and one of the process counters.

11. The computer of claim 9 the set of counters represent multiple simultaneous processes occurring simultaneously in the processing unit.

* * * * *